United States Patent [19]

Davies

[11] Patent Number: 5,474,352
[45] Date of Patent: Dec. 12, 1995

[54] PROTECTIVE CAPSULE

[76] Inventor: Patricia Davies, A310, 8 Rue CDT Rene Mouchotte, 75014 Paris, France

[21] Appl. No.: 282,282

[22] Filed: Jul. 29, 1994

[30] Foreign Application Priority Data

Aug. 4, 1993 [GB] United Kingdom ............... 9316183

[51] Int. Cl.⁶ .................................................. B60R 27/00
[52] U.S. Cl. .................... 296/24.1; 296/39.1; 296/188; 296/190; 296/197
[58] Field of Search .................................... 296/190, 188, 296/24.1, 39.1, 196, 197; 109/49.5; 89/36.01, 36.08

[56] References Cited

U.S. PATENT DOCUMENTS

| 4,227,735 | 10/1980 | Joyner | 296/24.1 |
| 4,470,228 | 9/1984 | Dirck | 296/24.1 X |
| 5,004,286 | 4/1991 | Taylor et al. | 296/24.1 |

FOREIGN PATENT DOCUMENTS

| 6027756 | 3/1960 | Italy | 296/24.1 |
| 2235166A | 2/1991 | United Kingdom . | |
| 1318145A | 5/1993 | United Kingdom . | |

*Primary Examiner*—Dennis H. Pedder
*Attorney, Agent, or Firm*—Jones, Tullar & Cooper

[57] ABSTRACT

A protective capsule for a vehicle consists of a shell made from prefabricated protective components which are assembled as an integral assembly inside a cab of the vehicle. The capsule has protective doors which are linked to side doors of the cab so that the linked doors are movable in unison. The components are adjustable relatively to one another and relatively to the floor of the cab to ensure a good fit inside the cab.

7 Claims, 3 Drawing Sheets

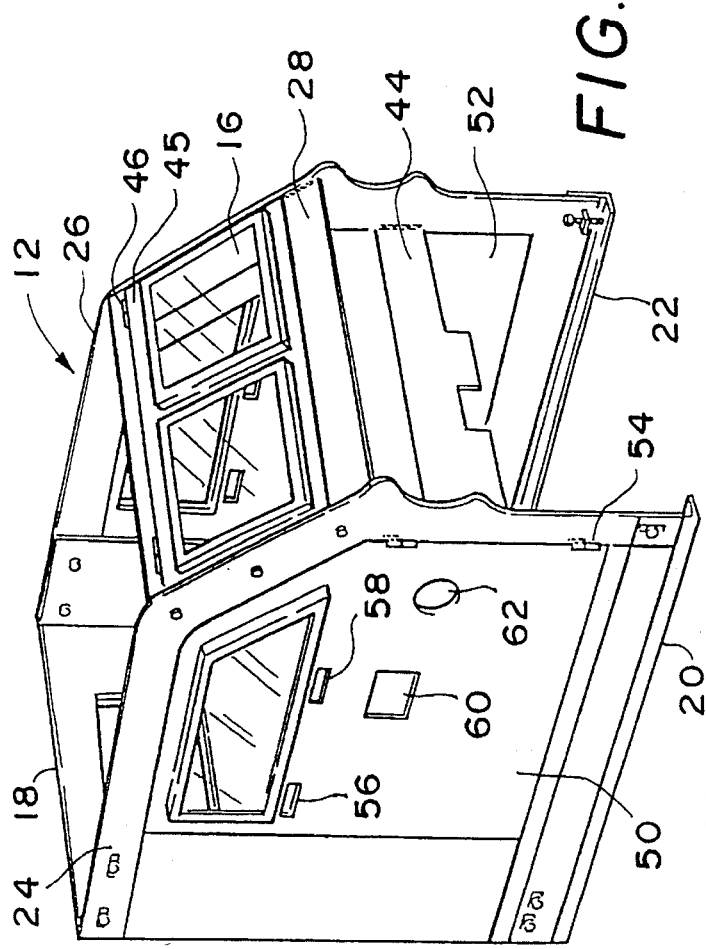
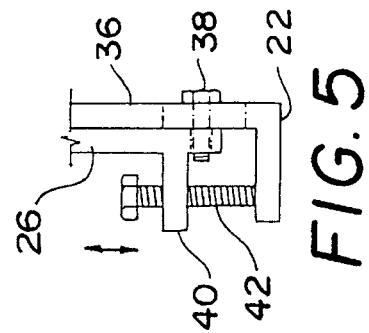
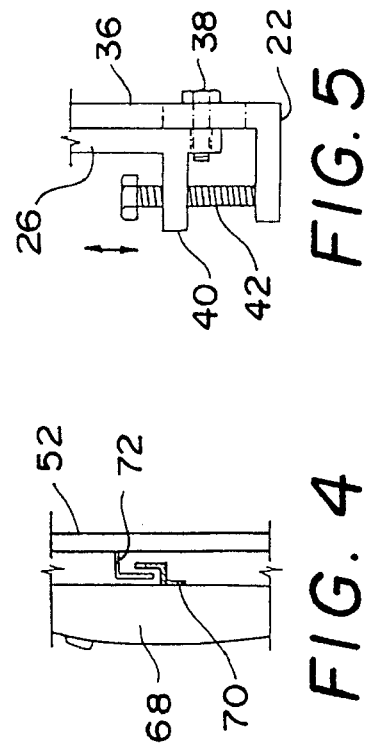
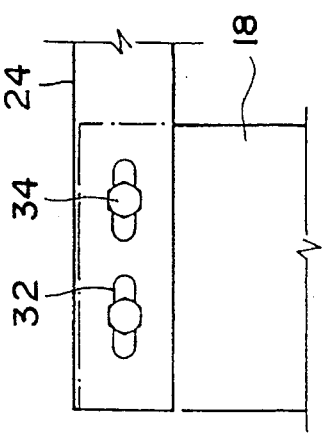

PROTECTIVE CAPSULE

BACKGROUND OF THE INVENTION

This invention relates to a capsule for protecting one or more occupants of a vehicle.

SUMMARY OF THE INVENTION

The invention provides a protective capsule for a vehicle which includes a shell which is formed from prefabricated protective components and which is assembled as an integral assembly inside a cab of the vehicle, the shell including a rear bulkhead which extends from a floor of the cab substantially vertically upwardly on a rear side of one or more seats in the cab, two opposed frame members secured to the bulkhead on opposed respective sides thereof, two protective doors, hinge means fixing the protective doors to the respective frame members, and a front section between the frame members which includes transparent protective material.

'Protective material', as used herein, is intended to include any material which generally will be sheet-like or substantially sheet like, capable of withstanding the impact of a bullet or other harmful projectile, or otherwise significantly impeding the passage of a bullet or a similar projectile. The protective material may be metallic, of glass, or made from a plastic or a composite material such as kevlar.

The cab of the vehicle may have at least two side doors and each protective door is preferably connected to a respective adjacent side door by guide means which guides the protective door and the adjacent side door to move in unison.

A portion of the front section may be pivotally secured between the frame members.

Each protective door may include a portion of transparent protective material and protective actuating means whereby a handle and a window opener of the respective adjacent side door can be operated.

First means may be provided for adjusting the position of each frame member relatively to the bulkhead, and second means for adjusting the position of each frame member relatively to a floor of the cab.

The shell may have two spaced members which rest on the floor of the cab on opposed respective sides of the cab and the bulkhead and the frame members may extend upwardly from the base members.

BRIEF DESCRIPTION OF THE DRAWINGS

The invention is further described by way of example with reference to the accompanying drawings in which:

FIG. 2 is a schematic perspective view of the protective capsule of the invention assembled but not installed in a vehicle, FIG. 3 is an enlarged view of an adjusting arrangement used in the capsule, FIG. 4 is a side view in section of portion of the capsule and a side door of the vehicle, FIG. 5 illustrates on an enlarged scale a second adjusting device used in the capsule.

DESCRIPTION OF PREFERRED EMBODIMENT

Figure 1:
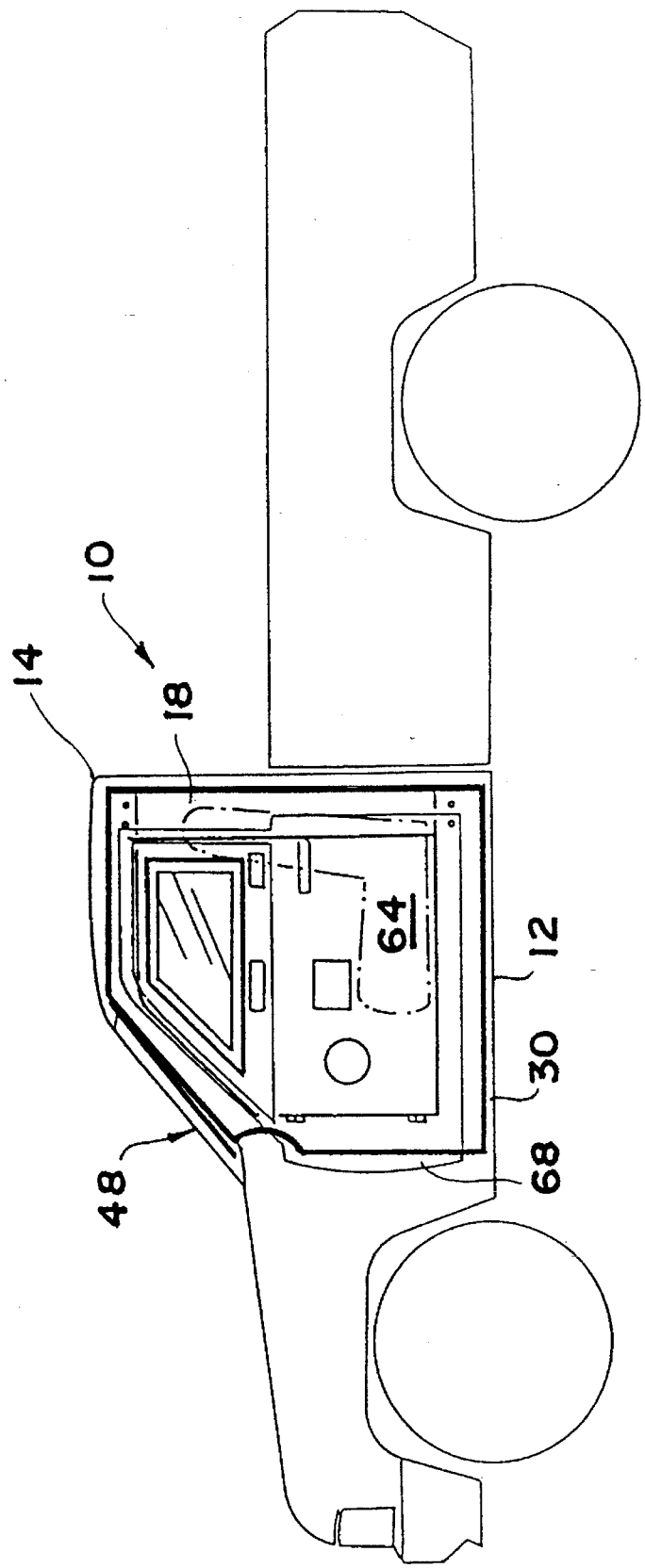
FIG. 1 is a side view of a light delivery vehicle which includes a protective capsule according to the invention.
Figure 7:
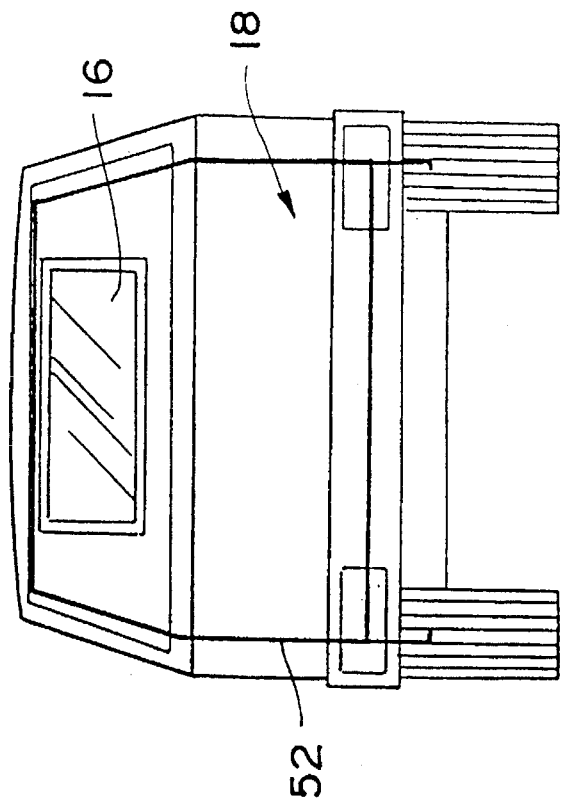
FIG. 7 is a view in elevation of the rear of the vehicle in FIG. 1.
Figure 6:
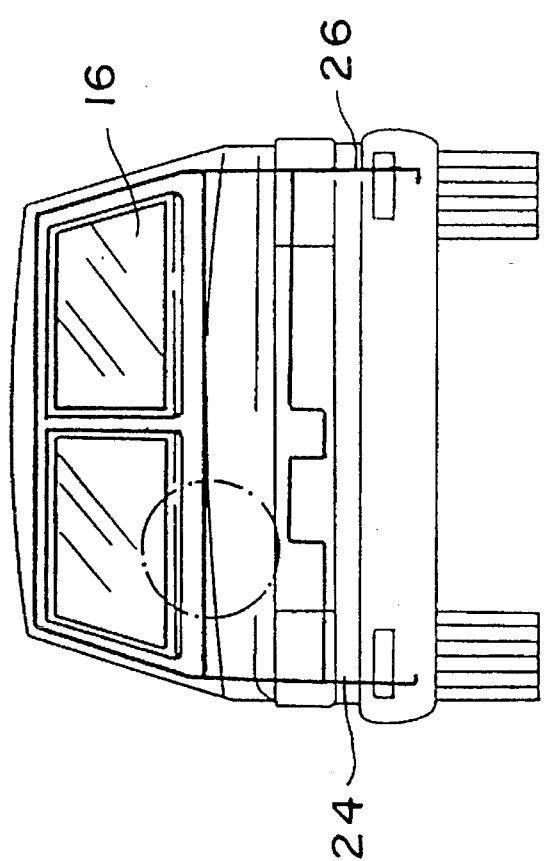
FIG. 6 is a front view in elevation of the vehicle of FIG. 1.

FIGS. 1, 6 and 7 illustrate a vehicle 10 from the side, from the front and from the rear respectively, in which is installed a protective capsule 12 shown in outline in the drawings.

FIG. 2 is a view in perspective of the capsule 12 assembled but not installed in the vehicle.

The capsule is made from prefabricated components which are assembled inside a cab 14 of the vehicle 10 to form an integral assembly inside the cab. The capsule is made principally from armour plating which is laser cut according to predetermined dimensions and has window openings 16 in which are mounted transparent protective material such as bullet proof glass or a plastics material.

The capsule includes a rear bulkhead 18, two base members 20 and 22 respectively, two opposed frame members 24 and 26, and a front section 28.

The base members 20 and 22 rest on a floor 30 of the cab on opposed sides thereof. The bulkhead 18 is secured at Its lower end to the two base members and the frame members 24 and 26 are secured to opposed upper ends of the bulkhead. Lower ends of the frame members are attached to forward ends of the respective base members 20 and 22. The front section 28 extends between opposed angled portions of the frame members.

The bulkhead 18 is secured to the base members and to the frame members using slotted connections of the kind shown in FIG. 3. This figure shows a portion of the frame member 24 with two spaced elongate slots 32 which extend in a horizontal direction. Bolts 34 which pass through registering holes in the bulkhead are engaged with the slots. It is clear that the frame member can be moved in a horizontal direction, to a limited extent, relatively to the bulkhead and then secured in position by tightening the bolts 34.

FIG. 5 is an end view illustration of the forward lower end of the frame member 26 engaged with a leading end of the base member 22. The base member 22 has an upstanding flange 36 and a bolt 38 is passed through a hole in the frame member and a slotted registering hole in the flange. A second flange 40 extends at right angles from the frame member. A bolt 42 is threadedly engaged therewith and bears on the floor of the cab or on the base member 22. It is apparent that by rotating the bolt in one direction or the other the frame member is caused to rise or drop relatively to the base member and once the frame member is at the correct desired height the bolt 38 can be tightened to lock the components to one another.

The front section 28 includes a lower portion 44 of armour plate and an upper section 45 which carries the window opening and which is attached by means of hinges 46 to the lower section. The hinges permit the lower end of the section 45 to be pivoted inwardly to the capsule so that access is thereby provided to the inner surface of the windscreen 48 of the vehicle.

Protective doors 50 and 52 are secured by means of hinges 54 to leading uprights of the frame members. The doors have a number of openings designated 56, 58, 60 and 62 respectively.

The various components of the capsule are connected to one another inside the cab of the vehicle. Firstly the base members 20 and 22 are installed and then the bulkhead 18 is fixed thereto in the manner shown in FIG. 3 behind seats 64 in the vehicle. The frame members are then positioned inside the cab and fixed to the bulkhead and the base members. The front section 28 is fixed to the frame members using bolts 68 and finally the doors are attached to the frame members. Using the adjusting arrangements, shown in FIGS. 3 and 5 the components are adjusted to fit neatly inside the cab, resting only on the floor and preferably not touching any side wall or roof of the cab. Ideally the bulkhead or the base members are secured to the cab using fastening formations which are normally provided in a vehicle for seat belts.

The capsule 12 forms an integral assembly totally enclosed in the cab of the vehicle and engaged substantially only with the floor of the vehicle. As indicated the openings 16 are occupied by transparent protective material and thus visibility is not significantly adversely affected, The rear bulkhead 18 may also have an opening 16, as is shown In FIG. 7, to permit rear visibility, Protection can be provided over the top of the capsule if required simply by securing a suitable plate between opposed upper ends of the frame members.

The opening 56 in each protective door is in register with the latch for the lock of the adjacent side door of the vehicle. The hole 58 can serve as a gun port through which protective fire can be delivered. The hole 60 coincides with the opening handle for the side door of the cab. The hole 62 coincides with the winder for the window of the side door of the cab. The openings 56 to 62 can be covered with removable plates to reduce the likelihood of stray bullets passing through these holes and injuring an occupant.

The front section 28 can have strategically placed openings or transparent protective material to enable instrumentation on the dashboard of the vehicle to be visible or be accessed. As has already been stated the window section 45 is pivotal about the hinges 46 to permit the inner side of the windscreen 48 to be accessed e.g. for cleaning purposes.

The protective doors 50 and 52 are preferably coupled to the side doors of the vehicle in such a way that the side doors and the protective doors can be moved in unison. This may be achieved in the manner shown in FIG. 4 which shows in cross section and from the side a portion of a vehicle door 68 and a portion of an adjacent protective door 52. The vehicle door 68 has an upwardly facing channel shaped guide member 70 fixed to it while the door 52 has a downwardly facing hook formation 72 which is slidably engaged with the guide 70. When one door is pivoted about its hinges the other door is caused to move in unison with it, with the sliding relative movement between the hook and the guide permitting the doors to move together even though their respective hinge points are not axially aligned.

A principle advantage of the invention is that the capsule is essentially free standing and is assembled inside the cab of the vehicle. Minimal internal adjustments to the cab are required and, if desired, the cab can be restored to its original condition with minimal effort once the capsule is removed.

I claim:

1. A protective capsule for a vehicle which includes a shell which is formed from prefabricated protective components and which is assembled as an integral assembly inside a cab of the vehicle, the shell including a rear bulkhead which extends from a floor of the cab substantially vertically upwardly on a rear side of one or more seats in the cab, two opposed frame members secured to the bulkhead on opposed respective sides thereof, two protective doors, hinge means fixing the protective doors to the respective frame members, and a front section between the frame members which includes transparent protective material.

2. A protective capsule according to claim 1 wherein the cab of the vehicle has at least two side doors and each of the protective doors is connected to a respective adjacent side door by guide means which guides the protective door and the adjacent side door to move in unison.

3. A protective capsule according to claim 1 wherein a portion of the front section is pivotally secured between the frame members.

4. A protective capsule according to claim 1 wherein each protective door includes a portion of transparent protective material.

5. A protective capsule according to claim 1 wherein each protective door includes protective access means whereby a handle and a window opener of the respective adjacent side door can be operated.

6. A protective capsule according to claim 1 which includes first means for adjusting the position of each frame member relatively to the bulkhead, and second means for adjusting the position of each frame member relatively to a floor of the cab.

7. A protective capsule according to claim 1 wherein the shell has two base members which rest on a floor of the cab on opposed respective sides of the cab, the bulkhead and the respective frame members extending upwardly from the base members.

* * * * *